United States Patent
Benjestorf

(10) Patent No.: US 12,456,881 B2
(45) Date of Patent: Oct. 28, 2025

(54) NON-METALLIC CONNECTION ELECTRICAL WALL OUTLET

(71) Applicant: Non-Metallic Connectors, Inc., Harrisburg, PA (US)

(72) Inventor: Joshua S. Benjestorf, Harrisburg, PA (US)

(73) Assignee: NON-METALLIC CONNECTORS, INC., Harrisburg, PA (US)

( * ) Notice: Subject to any disclaimer, the term of this patent is extended or adjusted under 35 U.S.C. 154(b) by 57 days.

(21) Appl. No.: 18/073,762

(22) Filed: Dec. 2, 2022

(65) Prior Publication Data

US 2024/0186826 A1 Jun. 6, 2024

(51) Int. Cl.

| | |
|---|---|
| *H02J 50/10* | (2016.01) |
| *H01R 13/10* | (2006.01) |
| *H01R 13/66* | (2006.01) |
| *H01R 13/70* | (2006.01) |
| *H01R 13/73* | (2006.01) |
| *H02J 50/00* | (2016.01) |

(52) U.S. Cl.
CPC .............. *H02J 50/10* (2016.02); *H01R 13/10* (2013.01); *H01R 13/6675* (2013.01); *H01R 13/70* (2013.01); *H01R 13/73* (2013.01); *H02J 50/005* (2020.01)

(58) Field of Classification Search
CPC .......... H02J 50/10; H02J 50/12; H02J 50/005; H02J 50/80; H01R 13/10; H01R 13/6675; H01R 13/70; H01R 13/73
See application file for complete search history.

(56) References Cited

U.S. PATENT DOCUMENTS

| | | | |
|---|---|---|---|
| 9,197,292 B2* | 11/2015 | Benjestorf | H04B 5/266 |
| 11,372,033 B1 | 6/2022 | Kincade et al. | |
| 2004/0106376 A1* | 6/2004 | Forster | H02J 50/10 |
| | | | 340/505 |
| 2012/0086281 A1 | 4/2012 | Kanno | |
| 2013/0069617 A1 | 3/2013 | Lee | |
| 2013/0070382 A1 | 3/2013 | Fabian et al. | |

(Continued)

OTHER PUBLICATIONS

Joshua S. Benjestorf, Design and Analysis of Wireless Power Transfer for Non-Metallic USB Connector, Mar. 23, 2020 (Year: 2020).*

(Continued)

*Primary Examiner* — Rexford N Barnie
*Assistant Examiner* — Rasem Mourad
(74) *Attorney, Agent, or Firm* — Panitch Schwarze Belisario & Nadel LLP

(57) ABSTRACT

A non-metallic contactless electrical wall outlet has a housing including a mounting interface and a panel. The mounting interface is configured to enable attachment of the housing to a wall. The panel forms an electrically contactless receptacle that is free of metallic material. A power supply is disposed within the housing and includes a supply input configured to electrically connect to an in-wall power source. A contactless electrical power transmitter is disposed within the housing and adjacent to the receptacle. The contactless electrical power transmitter is configured for electrical connection to the power supply and to contactlessly transmit electrical power to a plug received in the receptacle.

14 Claims, 11 Drawing Sheets

(56) References Cited

U.S. PATENT DOCUMENTS

| | | | | |
|---|---|---|---|---|
| 2014/0285008 | A1* | 9/2014 | Azancot | H01F 38/14 |
| | | | | 307/104 |
| 2014/0335803 | A1* | 11/2014 | Rivera | H01R 27/00 |
| | | | | 455/90.3 |
| 2017/0163045 | A1* | 6/2017 | Michaelraj | H05K 5/02 |
| 2017/0271918 | A1* | 9/2017 | Salerno | H05B 47/19 |
| 2018/0107245 | A1* | 4/2018 | Atkinson | H04B 5/79 |
| 2019/0333694 | A1* | 10/2019 | Ueta | H01F 38/14 |
| 2023/0043693 | A1 | 2/2023 | Benjestorf | |
| 2023/0088576 | A1 | 3/2023 | Benjestorf | |
| 2024/0097350 | A1* | 3/2024 | Li | H01Q 21/28 |

OTHER PUBLICATIONS

International Search Reporting and Written Opinion issued Apr. 3, 2024 in International Application No. PCT/US23/84012.

N. Zannat and P. D. Franzon, "Asymmetric Transformer Design With Multiband Frequency Response for Simultaneous Power and Data Transfer," in IEEE Transactions on Components, Packaging and Manufacturing Technology, vol. 10, No. 4, pp. 644-653, Apr. 2020, doi: 10.1109/TCPMT.2020.2977045.

A. More and B. Taskin, "EM and circuit co-simulation of a reconfigurable hybrid wireless NoC on 2D ICs," 2011 IEEE 29th International Conference on Computer Design (ICCD), 2011, pp. 19-24, doi:10.1109/ICCD.2011.6081370.

Benjestorf, Joshua, "Micro-Wireless Power Transfer with Applications to the Non-Metallic Connector", Master of Science Thesis, The Pennsylvania State University, Aug. 2021.

J. Shuo Liu and J. Lai "Accurate Expressions of Mutual Inductance and Their Calculation of Archimedean Spiral Coils," Energies 2019, 12, 2017, pp. 1-14, doi: 10.3390/en12102017.

K. Wang and S. Sanders, "Contactless USB—A Capacitive Power and Bidirectional Data Transfer System," pp. 1342-1347, 978-1-4799-2325-0/14, 2014.

J.S. Benjestorf, X. Liu "Non-mating connector for USB: A quality waterproof connection" Proc. 2013 IEEE Int. Conf. Consumer Electronics pp. 560-563 2013.

Benjestorf, Joshua S, "A New Trend in Connectivity: Sharing Content Over Multiple Channels," in IEEE Consumer Electronics Magazine, vol. 3, Issue 1, pp. 25-31, Jan. 2014.

J.S. Benjestorf, A. Morales, S. Agili, "Design and Analysis of Wireless Power Transfer for Non-Metallic USB Connector" Proc. 2020 IEEE Int. Conf. Consumer Electronics, ISBN 978-1-7281-5186-1, 2020.

M. Yamauchi et al., "Anomaly Detection in Smart Home Operation from User Behaviors and Home Conditions," in IEEE Transactions on Consumer Electronics, vol. 66, No. 2, pp. 183-192, May 2020.

D. Yang et al., "An Event-Driven Convolutional Neural Architecture for Non-Intrusive Load Monitoring of Residential Appliance," in IEEE Transactions on Consumer Electronics, vol. 66, No. 2, pp. 173-182, May 2020.

* cited by examiner

NON-METALLIC CONNECTION ELECTRICAL WALL OUTLET

BACKGROUND

Embodiments described herein relate generally to an electrical wall outlet, and more particularly, to an electrical wall outlet that lacks metal electrical power contacts and allows for contactless electrical power transfer, along with additional communication and smart capabilities.

A conventional electrical wall outlet includes one or more receptacles housing metal contacts that are connected to a mains or other type of in-wall power source. The receptacle is configured to receive exposed metal pins of a plug connected to a load. Receipt of the pins by the receptacle completes a circuit, allowing electrical power from the power source to be delivered to the load (typically after some form of conditioning).

This arrangement has been standard for over a century, but significant safety concerns still abound. Precautions are often necessary to prevent, for example, young children from touching the contacts within the outlet receptacles with their fingers or conductive foreign objects. There are risks of shorts when a plug is not fully inserted into a receptacle. Wet or damp conditions present hazards for electrical use. Techniques for addressing these types of dangers include mechanical blocks over the receptacle, ground fault interrupter outlets to cut electricity in the event of a short or overload, and the like. However, such solutions are far from sufficient.

Recent advances have been made in contactless power transmission, such as for waterproofing consumer electronics. For example, U.S. Pat. No. 9,197,292, the entire contents of which are incorporated by reference herein, and which was filed by the inventor of the present application, illustrates some techniques for contactlessly transmitting power over a connector using capacitive or inductive coupling. In these types of applications, a transmission side of a connector receives power from a power supply and contactlessly conveys at least some portion of that power to a receiving side of the connector, which is physically spaced apart from the transmission side. The receiving side may use the contactlessly received power to operate a load. One example involves a non-metallic light bulb and socket, as described in U.S. patent application Ser. No. 17/875,763, the entire contents of which are incorporated by reference herein, and which was filed by the inventor of the present application.

Separately, common wireless communication technologies, such as for providing Internet service to homes, buildings, and the like, require the purchase and placement of hardware (e.g., modems, routers, repeaters, and the like), which connect to electrical outlets as well as communication ports (e.g., in-wall Ethernet or phone jacks) via wires and cables. This can cause clutter resulting in tripping or other entanglement hazards, undesirable reductions in physical space, and degrade the visual appearance of the space.

The presence of modems and routers also subjects their users to potential cyber-attacks, where an attacker can gain access to a person's or business's private network for the purpose of, for example, extracting sensitive information.

It is therefore desired to provide an electrical wall outlet that avoids the need for metallic electrical contacts and reduces potential hazards associated with electrical power provision. It is also desired to be able to adapt an existing conventional plug for a powered device for use with a contactless electrical wall outlet. It is further desired to reduce clutter associated with wireless communication hardware. It is also desired to provide protection against cyber-attacks on incorporated wireless communication circuitry by detecting suspicious anomalies and alerting the user of same and/or shutting down the circuitry to minimize the potential impact of an attack.

BRIEF SUMMARY

Briefly stated, one embodiment comprises a non-metallic contactless electrical wall outlet having a housing including a mounting interface and a panel. The mounting interface is configured to enable attachment of the housing to a wall. The panel forms an electrically contactless receptacle that is free of metallic material. A power supply is disposed within the housing and includes a supply input configured to electrically connect to an in-wall power source. A contactless electrical power transmitter is disposed within the housing and adjacent to the receptacle. The contactless electrical power transmitter is configured for electrical connection to the power supply and to contactlessly transmit electrical power to a plug received in the receptacle.

In one aspect, the housing further includes an electrical enclosure connectable to the panel. The contactless electrical power transmitter is disposed between the electrical enclosure and the panel. In a further aspect, the electrical enclosure includes a recess that receives at least a portion of the receptacle therein when the panel is connected to the electrical enclosure. In a further aspect, the receptacle includes an end wall. The contactless electrical power transmitter is disposed within the electrical enclosure adjacent to the end wall of the receptacle.

In another aspect, a reed switch is disposed within the housing and configured to enter an activated state when in proximity to a magnetic field generated by the plug. The reed switch is in electrical communication with the power supply and the contactless electrical power transmitter such that: when the reed switch is in the activated state, the contactless electrical power transmitter is electrically connected to the power supply and is enabled to contactlessly transmit electrical power to the plug received in the receptacle, and when the reed switch is in an inactivated state, the reed switch prevents electrical connection between the power supply and the contactless electrical power transmitter.

In another aspect, the power supply is configured to output 120 VAC to the contactless electrical power transmitter.

In another aspect, the receptacle includes at least one magnet disposed proximate to a sidewall of the receptacle.

In another aspect, the mounting interface is a mounting bracket.

In another aspect, the contactless electrical power transmitter is a transmitting inductor coil.

In another aspect, a wireless communication circuit is disposed within the housing. The wireless communication circuit is configured to facilitate wireless communication over a network. In a further aspect, the wireless communication circuit includes a wireless router. In yet a further aspect, the wireless communication circuit further includes a modem. In a still further aspect, the wireless communication circuit is configured to connect to the Internet. In a further aspect, the wireless communication circuit includes one of a wireless communication extender or a wireless communication repeater. In still a further aspect, the wireless communication circuit includes a patch antenna disposed within the housing. In a further aspect, the wireless communication circuit is configured to connect to the Internet.

Another embodiment comprises a non-metallic contactless electrical plug having a housing body, at least a portion of which forms a coupling interface configured for insertion to an electrically contactless receptacle of a wall outlet. The coupling interface is free of metallic material. A power cord extends from the housing body. A contactless electrical power receiver is disposed within the housing body and adjacent to the coupling interface. The contactless electrical power receiver is configured for electrical connection to a load via the power cord and to contactlessly receive electrical power from the receptacle when the coupling interface is inserted into the receptacle.

In one aspect, the contactless electrical power receiver is a receiving inductor coil. In another aspect, the receiving inductor coil includes a predetermined number of turns. The predetermined number of terms is proportional to an output voltage of the plug. The output voltage is less than a voltage provided by the receptacle.

In another aspect, a power supply is disposed within the housing body and in electrical communication between the contactless electrical power receiver and the power cord. In still another aspect, the power supply includes at least one of a rectifier or a power converter.

In another aspect, the coupling interface includes at least one magnet disposed proximate to a sidewall of the coupling interface.

Yet another embodiment comprises a non-metallic contactless electrical power assembly having a wall outlet including an outlet housing with a mounting interface and a panel. The mounting interface is configured to enable attachment of the outlet housing to a wall. The panel forms an electrically contactless receptacle that is free of metallic material. An outlet power supply is disposed within the outlet housing and includes a supply input configured to electrically connect to an in-wall power source. A contactless electrical power transmitter is disposed within the outlet housing and adjacent to the receptacle. The assembly further includes an electrical plug having a plug housing body, at least a portion of which forms a coupling interface that is free of metallic material. A power cord extends from the plug housing body. A contactless electrical power receiver is disposed within the plug housing body and adjacent to the coupling interface. The contactless electrical power receiver is configured for electrical connection to a load. When the coupling interface of the plug is inserted into the receptacle of the wall outlet, the contactless electrical power transmitter and the contactless electrical power receiver are aligned and physically separated from one another such that the contactless electrical power transmitter is enabled to contactlessly transmit electrical power from the power supply of the wall outlet to the contactless electrical power receiver.

In one aspect, the contactless electrical power transmitter is a transmitting inductor coil and the contactless electrical power receiver is a receiving inductor coil. In yet another aspect, the transmitting inductor coil includes a first predetermined number of turns and the receiving inductor coil includes a second predetermined number of turns. A ratio of the first predetermined number of turns to the second predetermined number of turns is proportional to a ratio of a voltage supplied by the receptacle to an output voltage of the plug. In still another aspect, the voltage supplied by the receptacle is 120 VAC and the output voltage of the plug is one of 3 V, 5 V, 6 V, 12 V, 18 V, or 24 V.

In another aspect, a plug power supply is disposed within the plug housing body and in electrical communication between the contactless electrical power receiver and the power cord. In yet another aspect, the plug power supply includes at least one of a rectifier or a power converter.

In another aspect, a reed switch is disposed within the outlet housing and in electrical communication with the power supply and the contactless electrical power transmitter. An activation magnet is disposed within the plug housing body. When the activation magnet is not in proximity to the reed switch, the reed switch is in an inactivated state and prevents electrical connection between the power supply and the contactless electrical power transmitter.

In another aspect, the receptacle includes at least one magnet disposed proximate to a sidewall of the receptacle and the coupling interface includes at least one magnet disposed proximate to a sidewall of the coupling interface. The at least one magnet of the receptacle and the at least one magnet of the coupling interface are configured to interact with each other to retain the coupling interface in the receptacle.

Still another embodiment comprises a plurality of non-metallic contactless electrical wall outlets configured to establish or connect to a common wireless network. Each of the plurality of wall outlets includes a housing having a mounting interface and a panel. The mounting interface is configured to enable attachment of the housing to a wall. The panel forms an electrically contactless receptacle that is free of metallic material. A power supply is disposed within the housing and includes a supply input configured to electrically connect to an in-wall power source. A contactless electrical power transmitter is disposed within the housing and adjacent to the receptacle. The contactless electrical power transmitter is configured for electrical connection to the power supply and to contactlessly transmit electrical power to a plug received in the receptacle. A wireless communication circuit is disposed within the housing. The wireless communication circuit is configured to facilitate wireless communication over the common network.

In one aspect, the wireless communication circuit of at least one of the plurality of wall outlets includes a wireless router. In another aspect, the wireless communication circuit of at least one of the plurality of wall outlets includes a modem. In still another aspect, the wireless communication circuit of at least one of the plurality of wall outlets includes one of a wireless communication extender or a wireless communication repeater.

In another aspect, the common network is a star network.

In another aspect, the wireless communication circuit of at least one of the plurality of wall outlets is configured to serve as a central hub of the common network.

In another aspect, the common network is a mesh network.

In another aspect, the wireless communication circuit of each of the plurality of wall outlets includes a patch antenna disposed within the respective housing.

In another aspect, the common network is configured to connect with the Internet.

Yet another embodiment comprises a non-metallic contactless electrical wall outlet including a housing having a mounting interface and a panel. The mounting interface is configured to enable attachment of the housing to a wall. The panel forms an electrically contactless receptacle that is free of metallic material. A power supply is disposed within the housing and includes a supply input configured to electrically connect to an in-wall power source. A contactless electrical power transmitter is disposed within the housing and adjacent to the receptacle. The contactless electrical power transmitter is configured for electrical connection to the power supply and to contactlessly transmit electrical power to a plug received in the receptacle. A wireless communication circuit is disposed within the housing. The wireless communication circuit is configured to facilitate wireless communication over a network and includes at least one of a modem or a wireless router. A controller is disposed within the housing and is configured to collect, store, and analyze data related to patterns regarding power usage from the power supply with respect to time, and determine, based on the analyzed data, whether a current power usage from the power supply is anomalous.

In one aspect, the controller uses machine learning to analyze the data related to the patterns regarding power usage from the power supply with respect to time. In another aspect, the machine learning is performed by a neural network.

In another aspect, the controller is further configured to, in response to determining an anomalous power usage, transmit an alert message. In yet another aspect, the controller is configured to send the alert message using the wireless communication circuit.

In another aspect, the controller is further configured to, in response to determining an anomalous power usage, turn off the at least one of the modem or the wireless router.

In another aspect, the controller is further configured to receive data related to power usage from another wall outlet.

Yet another embodiment comprises a plug adapter having a housing body including an outlet face having first and second slots formed therein. A coupling interface is configured for insertion to an electrically contactless receptacle. The coupling interface is free of metallic material. A first adapter contact is disposed within the housing body and accessible via the first slot. A second adapter contact is disposed within the housing body and accessible via the second slot. A power supply is disposed within the housing body and in electrical communication with the first and second adapter contacts. A contactless electrical power receiver is disposed within the housing body and adjacent to the coupling interface. The contactless electrical power receiver is configured for electrical connection to the power supply and to contactlessly receive electrical power from the receptacle when the coupling interface is inserted into the receptacle.

In one aspect, the coupling interface includes at least one magnet disposed proximate to a sidewall of the coupling interface. In another aspect, a magnet cage is disposed within the body and is configured to hold the at least one magnet proximate to the sidewall of the coupling interface.

In another aspect, the power supply includes at least one of a rectifier or a power converter.

In another aspect, the contactless electrical power receiver is a receiving inductor coil.

In another aspect, the outlet face is arranged at an opposite end of the housing body from the contactless electrical power receiver.

In another aspect, a first ring terminal wire connector is electrically connected to the first adapter contact and a second ring terminal wire connector is electrically connected to the second adapter contact.

In another aspect, the coupling interface includes a longitudinally extending rib protruding from a sidewall thereof.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
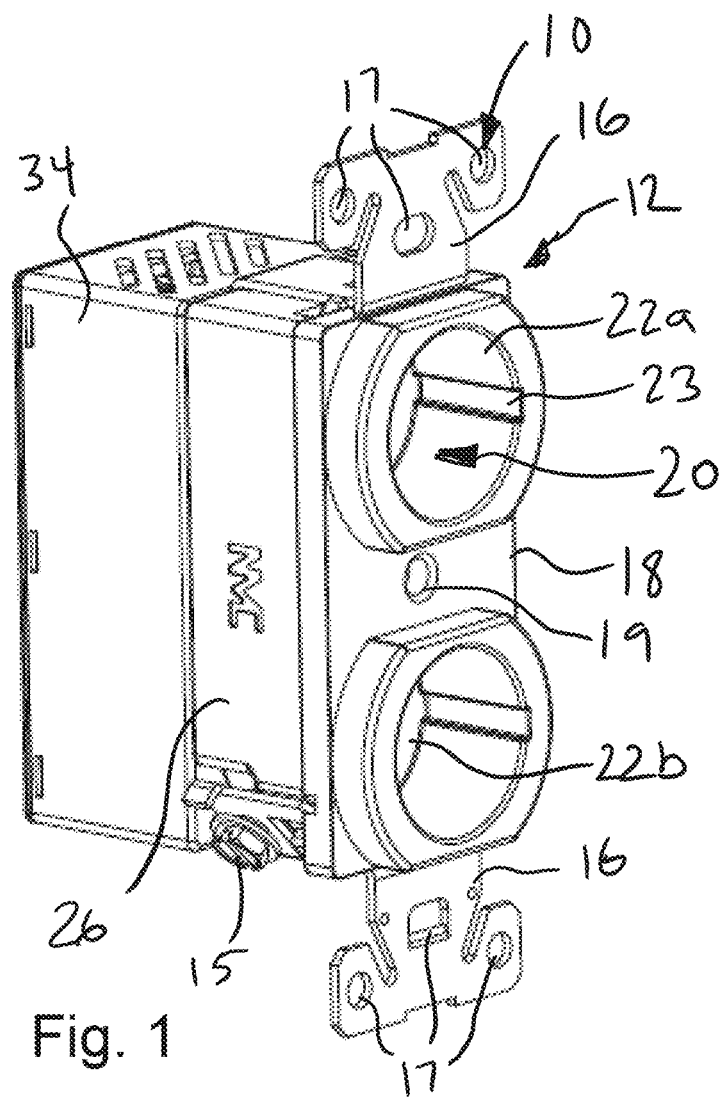
FIG. 1 is a front right side perspective view of a wall outlet in accordance with an example embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
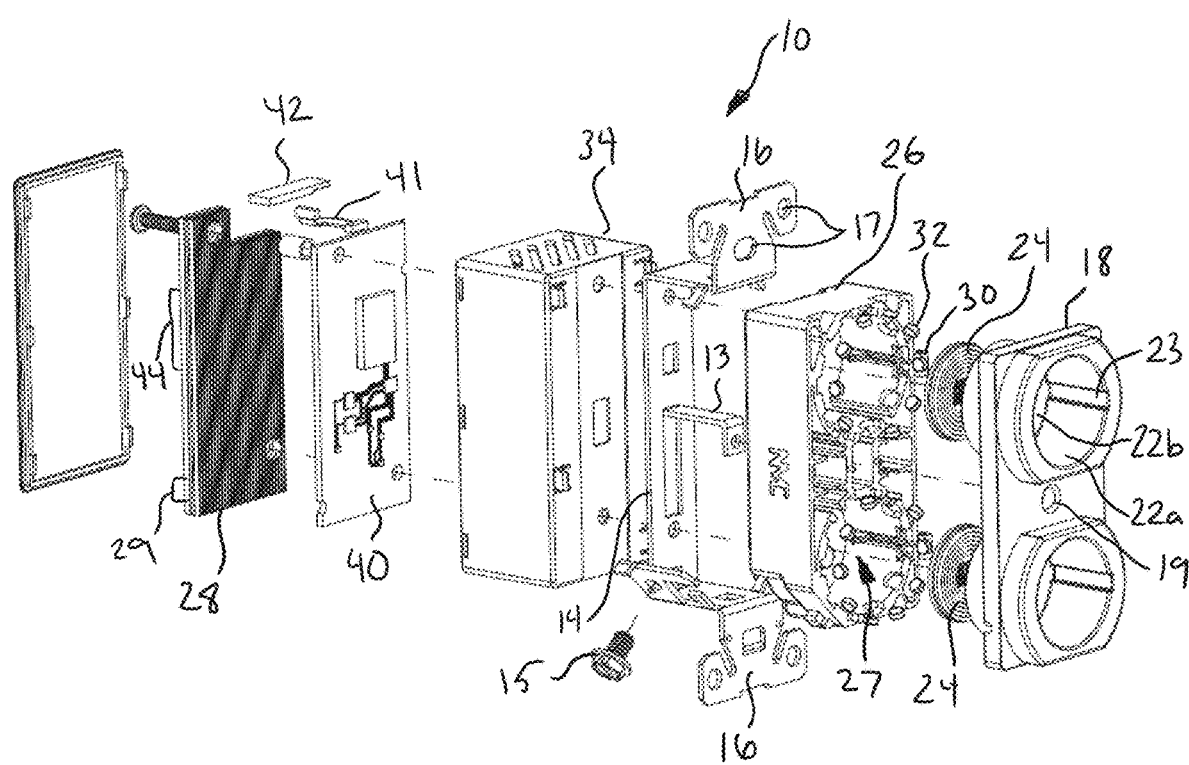
FIG. 2 is a front right side perspective exploded view of the wall outlet of FIG. 1.

Referring to FIGS. 1 and 2, there is shown an example of a wall outlet 10 having a housing 12. The housing 12 may include a mounting interface 14 that is configured to enable attachment of the housing 12 to a wall (not shown). The wall may be a finished wall (e.g., having drywall, paneling, or other materials coupled to a frame), a framed wall (e.g., including studs, trim, or the like), a partially finished wall, or the like. Attachment to the wall may be external or the wall outlet 10 may be at least partially received within an opening of the wall and/or attached to an internal component of the wall (e.g., a stud or the like).

In the embodiment shown in FIGS. 1 and 2, the mounting interface 14 takes the form of a mounting bracket that may include top and bottom tabs 16 each having one or more fastening slots 17 configured to receive a fastener (e.g., screw, pin, nail, or the like) (not shown) for securing the housing 12 to a supporting structure. For example, the fastening slots 17 in the mounting bracket 14 shown in FIGS. 1 and 2 are positioned according to standard junction box dimensions. That is, the housing 12 may be secured to and/or within a conventional junction box (not shown) or like structure attached to a wall. In some embodiments, the housing 12 of the wall outlet 10 may itself perform the function of a junction box, and the tabs 16 and fastening slots 17 of the mounting bracket 14 may be used to secure the housing 12 to another supporting structure on or within a wall. In other embodiments, the mounting interface 14 can take other forms sized, shaped, and oriented to enable the desired attachment. For example, the mounting interface 14 may be provided to enable side mounting to a wall stud or the like. The mounting interface 14 may utilize mechanical fasteners, adhesives, snap connections, combinations thereof, or other like components for enabling attachment to a wall.

While the outlet 10 is shown and described herein as mainly being mounted to or within a wall, the outlet 10 may also be used in other circumstances where outlets may be found, for example, in a vehicle, as part of a portable power supply (e.g., a generator or the like), interior or exterior posts, or the like.

The mounting bracket 14 shown in FIG. 2 may be configured to receive a ground screw 15 for electrical grounding, as is found in conventional outlets. However, ground wire connections may alternatively be provided by other components of the housing 12 besides the mounting interface 14.

While the mounting interface 14 is shown in FIG. 2 as a separate component of the housing 12 that is coupled to other components of the housing 12 by snap-fit, friction-fit, and/or mechanical fasteners, the mounting interface 14 may alternatively be made as a unitary structure with one or more other components of the housing 12, as desired.

The housing 12 may further include a panel 18 that forms one or more electrically contactless receptacles 20. Two receptacles 20 are shown in FIGS. 1 and 2, but any number of receptacles 20 may be provided by the panel 18. Each receptacle 20 essentially replaces a conventional two- or three-prong outlet receptacle and is configured to receive a contactless plug, such as that shown in FIGS. 3-5 (plug 100) and described in more detail below, for contactlessly transmitting electrical power. The receptacle 20 may take the form of a cavity formed within the panel 18 by one or more sidewalls 22a and an end wall 22b closing the receptacle 20 and preventing exposure of components located within the housing 12 behind the panel 18. In the example shown in FIGS. 1 and 2, a single, cylindrical sidewall 22a is shown, with at least one groove 23 formed therein to facilitate alignment and/or locking of the plug 100 therein. However, the receptacle 20 may have four sidewalls 22a forming a rectangular opening, or other shapes, as desired.

Each receptacle 20 may be free of metallic material to avoid the presence of exposed or accessible metallic contacts as exist in conventional receptacles on a traditional outlet. For example, at least the sidewall(s) 22a and end wall 22b in the example of FIGS. 1-2 may be made from plastic or other types of non-metallic, electrically insulative material. Other portions of the housing 12, such as the panel 18 or the like, may also similarly be made from non-metallic material.

The wall outlet 10 may further include a contactless electrical power transmitter 24 that may be disposed within the housing 12, and more particularly, adjacent to the receptacle 20. In wall outlets 10 having multiple receptacles 20, each receptacle may be associated with a respective contactless electrical power transmitter 24. In the example shown in FIG. 2, each contactless electrical power transmitter 24 is disposed adjacent to the end wall 22b of a respective receptacle 20. In the example shown in FIGS. 1-2, the housing 12 further includes an electrical enclosure 26 that is connectable to the panel 18, and the contactless electrical power transmitter 24 may be disposed between the electrical enclosure 26 and the panel 18. In this example, the electrical enclosure 26 may have a recess 27 that receives at least a portion of the receptacle 20 therein when the panel 18 is connected to the electrical enclosure 26, such that the contactless electrical power transmitter 24 is disposed within the electrical enclosure 26 and adjacent the end wall 22b of the receptacle 20. Other configurations and orientations of the panel 18 and electrical enclosure 26 may be made as well, including constructions using more or fewer parts. In the embodiment shown in FIGS. 1 and 2, the panel 18 may include a connection hole 19 configured to receive a screw or other mechanical type of fastener (not shown). The mounting interface 14 may include a securing arm 13, to which a screw extending through the connection hole 19 may be received. The securing arm 13 may extend through the electrical enclosure 26 such that tightening of the screw through the connection hole 19 on the panel 18 to the securing arm 13 secures the panel 18 to the electrical enclosure 26 disposed between the panel 18 and the mounting interface 14. However, connections between the panel 18 and electrical enclosure 26 may be made using other methods, including other types of mechanical fasteners, friction fit, adhesives, or the like. Moreover, the contactless electrical power transmitter 24 or portions thereof, may be disposed anywhere in the housing 12 as necessary to meet particular sizing or shape needs and to facilitate the contactless transmission of electrical power. The contactless electrical power transmitter 24 may be directly or indirectly secured to the end wall 22b of the receptacle and/or other components of the housing 12 through friction fit, mechanical fasteners, adhesives, or the like.

In the embodiment shown, the contactless electrical power transmitter 24 is a transmitting inductor coil, such as part number 760308105214 available from WURTH ELEKTRONIK. In other embodiments, the coil may be made from a mixture of conductive material and carbon-based material, such as carbon nanotubes. Such a mixture allows for an increase in power density to allow the contactless electrical power transmitter 24 to provide higher power with smaller space requirements. Additionally or alternatively, other types and styles of inductor coils may be used as well. Still further, the contactless electrical power transmitter 24 may instead comprise a capacitive plate, a combination of an inductor coil and a capacitive plate, or the like.

A power supply 28 may be disposed within the housing 12. In FIG. 2, the power supply 28 is shown as being disposed within a PCB enclosure 34 of the housing 12, which is a separate compartment that may be attached to the electrical enclosure 26 described above. However, the power supply 28 may alternatively be housed by the electrical enclosure 26 or within other areas of the housing 12, as desired. Moreover, the electrical enclosure 26 and PCB enclosure 28 may, in some embodiments, together form a single compartment of the housing 12 rather than two separate compartments, as shown.

The contactless electrical power transmitter 24 is configured for electrical connection to the power supply 28 such that at least a portion of the power provided thereto may be contactlessly transmitted to a plug 100 received in the corresponding receptacle 20. The power supply 28 may include a supply input 19 that is configured to electrically connect to an in-wall power source (not shown), such as in-wall wiring electrically connected to a mains or other building power supply (not shown) or the like. In some embodiments, the supply input 29 may be a terminal block with screws, clamps, or other fasteners (not shown) for retaining exposed wire ends (not shown) from the in-wall power source. Wiring may enter the housing 12, for example, via one or more openings (not shown). In some embodiments, the supply input 29 may extend out of or be external to the housing 12. The supply input 29 may take other forms as well, such as wiring that extends outside of the housing 12, a harness or other connector located inside or external to the housing 12, or the like.

The power supply 28 in FIG. 2 takes the form of a printed circuit board that may include electronic components for conditioning the electrical signal received from the in-wall power source, if necessary, such as rectification, voltage leveling, combinations thereof, or the like. For example, where the power supply 28 is required to provide electrical power to additional components located within the housing 12 (as will be explained in further detail below), it will often be necessary to step down the voltage received from the in-wall power source and may also be necessary to supply an altered frequency or a DC signal to the relevant component. For providing power to the receptacle(s) 20, often the power supply 28 will pass through the 120 or 240 VAC 50 or 60 Hz signal (or other power signal) provided from the in-wall power source, as in a conventional wall outlet. However, the invention is not so limited and the power supply 28 may be configured to or connect with additional circuitry that can alter the signal supplied to the receptacle(s) 20, as desired.

To prevent unwanted transmission by the contactless electrical power transmitter 24 when the plug 100 is misaligned or absent, a reed switch 30 may be provided within the housing 12. The reed switch 30 may be configured to enter an activated state when in proximity to a magnetic field generated by the plug 100, as will be explained in further detail below. The reed switch 30 may be in electrical communication with the power supply 28 and the contactless electrical power transmitter 24, directly or indirectly, to control operation of the contactless electrical power transmitter 24. For example, when the reed switch 30 is in the activated state, the contactless electrical power transmitter 24 may be electrically connected to the power supply 28 and may be able to receive power that the contactless electrical power transmitter 24 can then transmit to the plug 100. In contrast, when the reed switch 30 is in an inactivated state, such as where the plug 100 is disconnected from or misconnected to the receptacle 20, the reed switch 30 may prevent electrical connection between the power supply 28 and the contactless electrical power transmitter 24. The reed switch 30 may be configured and operate similarly to that described in U.S. patent application Ser. No. 17/947,501, the entire contents of which are incorporated by reference herein, and which was filed by the inventor of the present application.

Figure 3:
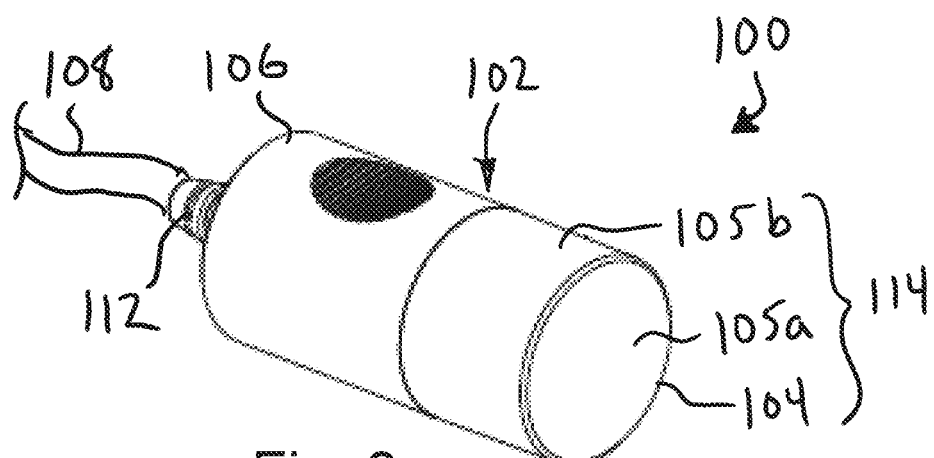
FIG. 3 is a rear left side perspective view of a plug in accordance with another example embodiment of the present invention.
Figure 4:
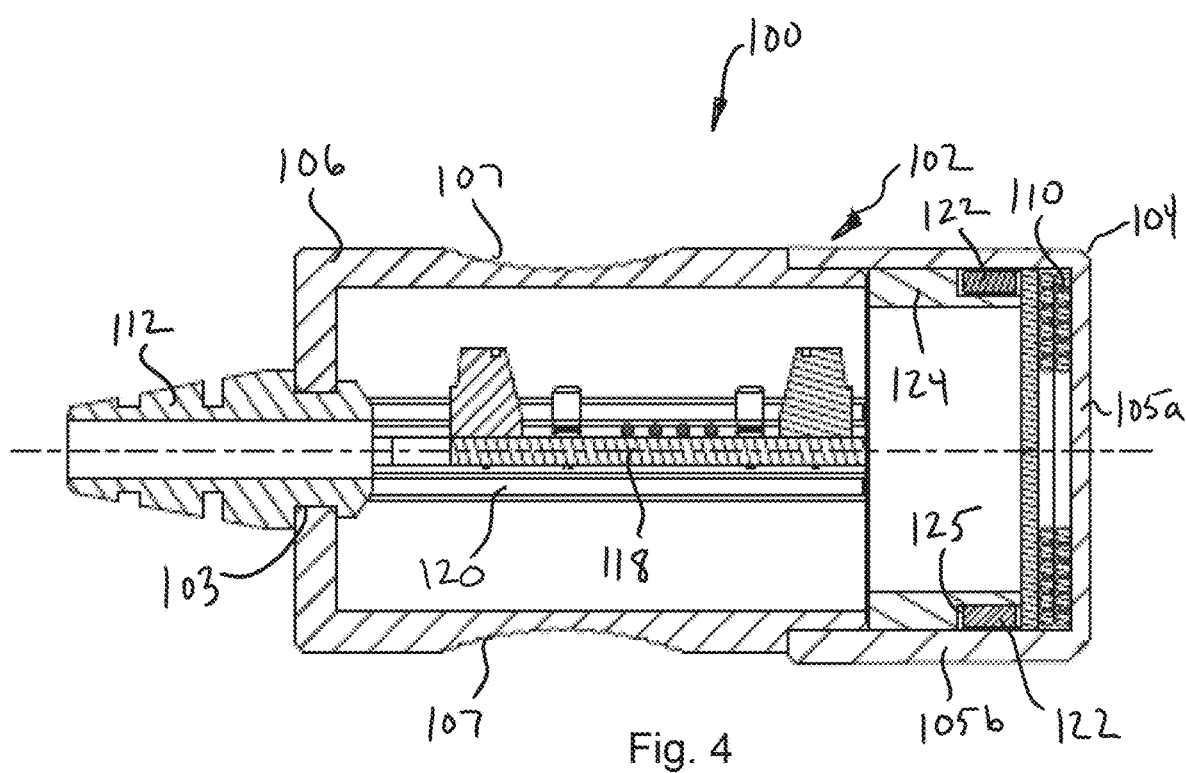
FIG. 4 is a left side elevational cross-sectional view of the plug of FIG. 3.
Figure 5:
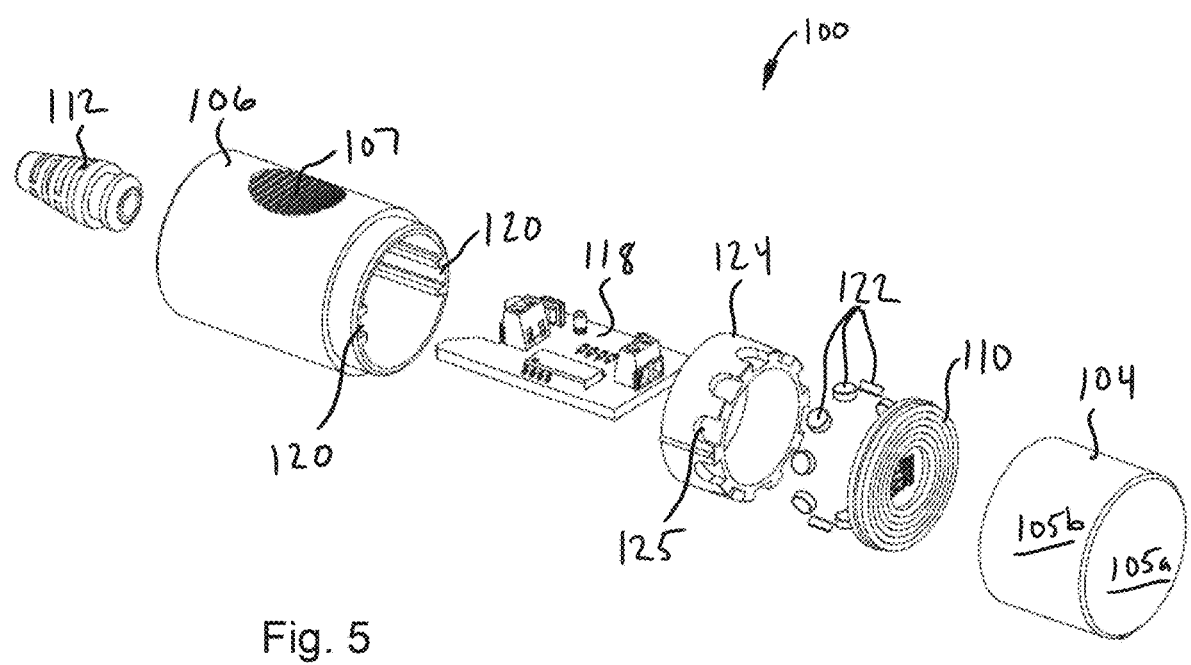
FIG. 5 is a rear left side perspective exploded view of the plug of FIG. 3.

Referring to FIGS. 3-5, the plug 100 may include a housing body 102. In the example shown in the drawings, the plug housing body 102 is made primarily from two main components—a cap 104 and a backshell 106 that are connected to one another. However, the plug housing body 102 may be formed by a unitary structure or can be divided among any number of desired portions that can be attached together. The cap 104 and backshell 106 may be press fit together at mating ends thereof and supplemented with adhesive. However, other methods of attaching the cap 104 and backshell 106 to one another can be used as well, such as using mechanical fasteners, screw threads, welding, combinations thereof, or the like. The backshell 106 may include finger grips 107, such as textured and/or concave sections that enable better gripping of the plug 100 by the user for insertion and/or removal of the plug 100 from an outlet or other receptacle.

The plug housing body 102 may be connected to a power cord 108 or other similar cable, wire, or the like, which may connect at its opposing end to a load (not shown). In the particular embodiment shown in the drawings, the plug housing body 102 may include an opening 103 formed therein to allow insertion of electrical power leads (e.g., via wires, cables, or the like, not shown) extending from the load, which may be coupled with a contactless electrical power receiver 110, which will be described in further detail below. The power cord 108 may be supported adjacent the opening 103 by a wire strain relief element 112 that prevents excessive bending of the power cord 108 near the opening 103 to minimize fraying or damage to the power cord 108 and the wiring held therein. In some embodiments, it may be beneficial to provide a seal (not shown) at the opening 103 of the plug housing body 102 or an interior seal in place of or supplementing a seal directly at the opening 103. In other embodiments, the plug 100 may be integrally formed with or attached to the load.

The plug housing body 102 may include a coupling interface 114 configured for insertion to the receptacle 20 of the wall outlet 10. In the example shown in FIGS. 3-5, the coupling interface 114 is formed mainly from the cap 104 of the plug housing body 102. The cap 104 may include an end plate 105a and a cylindrical sidewall 105b extending therefrom, although other shapes and configurations may be used as well, which may be influenced by spacing requirements, the shape of the receptacle 20, or other like considerations. The coupling interface 114 may include additional or other components of the plug housing body 102 in alternative embodiments. Moreover, it is conceivable that a reverse configuration, wherein the plug housing body 102 forms a recess and receives a mating protruding portion of the wall outlet 10, can be used.

Notably, the coupling interface 114 may be free of metallic material to avoid the presence of exposed pins as exist in conventional plugs. For example, at least the end plate 105a and sidewall(s) 105b of the cap 104 in the example of FIGS. 3-5 may be made from plastic or other types of non-metallic, electrically insulative material.

The contactless electrical power receiver 110 may be disposed within the plug housing body 102, and more particularly, adjacent to the coupling interface 114. In the example shown in FIGS. 3-5, the contactless electrical power receiver 110 is disposed adjacent to the end plate 105a of the cap 104. For example, as shown in FIG. 4, the contactless electrical power receiver 110 may abut an internal surface of the end plate 105a. However, the contactless electrical power receiver 110, or portions thereof, may be disposed anywhere in the plug housing body 102 as necessary to meet particular sizing or shape needs and to facilitate the contactless receipt of electrical power. The contactless electrical power receiver 110 may be directly or indirectly secured to the end plate 105a and/or other components of the plug housing body 102 through friction fit, mechanical fasteners, adhesives, or the like. In the embodiment shown, the contactless electrical power receiver 110 is a receiving inductor coil of the same make and model as the contactless electrical power transmitter 24 (e.g., part number 760308105214 available from WURTH ELEKTRONIK). However, the contactless electrical power receiver 110 may be of a different make and/or model as well. Additionally or alternatively, other types and styles of inductor coils may be used. In other embodiments, the contactless electrical power receiver 110 may instead comprise a capacitive plate, a combination of an inductor coil and a capacitive plate, or the like.

For inductive transfer, when the coupling interface 114 of the plug 100 is inserted into the receptacle 20, the contactless electrical power transmitter 24 and receiver 110 may function as a separable transformer, with the contactless electrical power transmitter 24 operating as the primary coil and the contactless electrical power receiver 110 operating as the secondary coil. As such, it can be possible to modify the output voltage of the plug 100 relative to the voltage provided by the receptacle 20 by controlling the number of turns of the inductor coil in the contactless electrical power receiver 110. That is, a ratio of the number of turns of an inductor coil in the contactless electrical power transmitter 24 to the number of turns of the inductor coil in the contactless electrical power receiver 110 may be proportional to a ratio of the voltage supplied by the receptacle 20 to the output voltage of the plug 100.

In many cases, the output voltage of the plug 100 will be less than the voltage at the receptacle 20. For example, most devices do not operate at the standard outlet voltages of 120 or 240 VAC. Given a fixed, known number of turns of the inductor coil in the contactless electrical power transmitter 24, the plug 100 may be designed to have a predetermined number of turns that allows the voltage to be stepped down to any desired operating voltage of the load. Standard operating voltages for output by the plug 100 may be 3 V, 5 V. 6 V. 12 V. 18 V, and 24 V, although other output voltages may be obtained as well. Thus, various plugs 100 may be designed with different predetermined numbers of turns in the inductor coil of the contactless electrical power receiver 110 to accommodate different power delivery requirements.

A plug power supply 116 may be disposed within the plug housing body 102 and in electrical communication between the contactless electrical power receiver 110 and the power cord 108. The plug power supply 116 may include a printed circuit board 118 that may be mechanically or adhesively secured to the plug housing body 102. For example, the backshell 106 may include a pair of mounting tracks 120 sized and positioned to receive edges of the printed circuit board 118 of the plug power supply 116. Of course, other methods for mounting the printed circuit board 118, such as mechanical fasteners, adhesives, welding, combinations thereof, or the like may be used as well. In addition, components of the plug power supply 116 need not be confined to a single printed circuit board 118 but may instead be disposed among multiple boards, directly formed or mounted to the plug housing body 102, or the like.

The plug power supply 116 may further include electronic components for receiving electrical power from the contactless electrical power receiver 110 and making necessary adjustments for application of that electrical power to the power cord 108. For example, the plug power supply 116 may include a rectifier (not shown) for converting the AC electrical signal received by the contactless electrical power receiver 110 into a DC electrical signal. The plug power supply 116 may further include a power converter (not shown) for stepping a voltage of the electrical signal to a level appropriate for powering the load. The plug power supply 116 may also include any other electronics that are necessary for modifying, storing, and/or delivering electrical energy necessary for driving the load or other related electronic components.

When the coupling interface 114 of the plug 100 is inserted into the receptacle 20 of the wall outlet 10, the contactless electrical power transmitter 24 and the contactless electrical power receiver 110 may be aligned and physically separated from one another by at least the end plate 105a of the cap 104 of the plug housing body 102 and the end wall 22b of the receptacle 20 of the wall outlet 10. Thicknesses of the end plate 105a and the end wall 22b may be designed to put the contactless electrical power transmitter 24 and the contactless electrical power receiver 110 at an optimum distance from one another for maximizing contactless electrical power transfer. Such separation may be by a distance of about 3 mm. However, other distances may be used as well, depending on the size and other characteristics of the contactless electrical power transmitter 24 and the contactless electrical power receiver 110, space requirements, power requirements, and the like.

To generate the magnetic field for actuating the reed switch 30 associated with the receptacle 20 in the wall outlet 10, the plug 100 may include one or more magnets 122 disposed within the plug housing body 102. The magnet 122 may be a permanent magnet, such as a neodymium magnet or the like. However, the magnet 122 may alternatively be an electromagnet or like type of magnet. In the embodiment shown in FIGS. 4-5, the plug 100 includes a plurality of magnets disposed proximate to the sidewall 105b of the cap 104 and spaced apart from one another in a circumferential orientation. A magnet cage 124 may be provided within the body 102 that is configured to hold the magnet(s) 122 proximate to the sidewall 105b. The magnet cage 124 in FIGS. 4-5 takes the form of a ring having a plurality of pockets 125 for receiving each of the magnets 122 therein. Of course, other shapes and configurations of the magnet cage 124, or alternative structures for supporting the magnets (e.g., mechanical or adhesive attachment to the cap 104, or the like) may be used as well. When the plug 100 is inserted into the receptacle 20 in an appropriately aligned manner, one of the magnets 122 may be in proximity with the reed switch 30 for the receptacle 20, placing the reed switch 30 in an activated state to allow the electrical connection between the power supply 28 and the contactless electrical power transmitter 24, thereby enabling contactless electrical power communication to the plug 100.

The groove 23 in the receptacle 20 described above may be one method of ensuring proper alignment of a magnet 122 in the plug 100 with the reed switch 30 (or to provide proper alignment of other features of the wall outlet 12 and plug 100), although the particular example plug 100 shown in FIGS. 3-5 does not have a corresponding mating feature (see FIGS. 7-10 as an example that may be utilized with the plug 100). Instead, in the embodiment shown in FIGS. 3-5, the magnets 122 of the plug 100 may be used to obtain alignment in the receptacle 20. For example, and referring to FIG. 2, each receptacle 20 may include at least one magnet 32 proximate to the sidewall 22a. FIG. 2 shows a plurality of magnets 32 spaced apart from one another and surrounding the sidewall 22a in a configuration similar to the arrangement of magnets 122 in the plug 100. The magnets 32, 122 may aid alignment by attracting one another such that the receptacle 20 and the plug housing body 102 achieve a desired orientation with respect to one another. The magnets 32, 122 may also serve to hold the plug 100 in place within the receptacle 20 against accidental disconnection. In this example, one of the magnets 122 in the plug housing body 102 serves as an activation magnet for the reed switch 30, while the other magnets 122 interact with the magnets 32 in the wall outlet 10 to orient and hold the plug 100 in place. However, different methods for securing and aligning the plug housing body 102 in the receptacle 20, including combinations of methods, may be used in keeping with the spirit of the invention.

There may be situations in which it is desirable to adapt a conventional plug with metallic contact pins for use with contactless electrical wall outlets, such as the outlet 10 shown in FIGS. 1 and 2. A plug adapter, an example of which is shown in FIGS. 7-10, may be provided for such purpose. The plug adapter 200 may include a number of elements similar to those described above for the contactless electrical plug 100. Therefore, like numerals have been used for the plug adapter 200, except the 200 series numerals have been used. Accordingly, a complete description of the plug adapter has been omitted, with mainly the differences being described.

Like the plug 100, the plug adapter 200 may have a housing body 202 with a coupling interface 214 that may be free of metallic material and configured for insertion to an electrically contactless receptacle (see e.g., 20 in FIGS. 1-2). Also similar to the plug 100, the plug adapter 200 may include at least one magnet 222 disposed proximate to a sidewall 205b of the coupling interface 214, and magnet(s) 222 may be held in such location by a magnet cage 224 disposed within the housing body 202.

Figure 10:
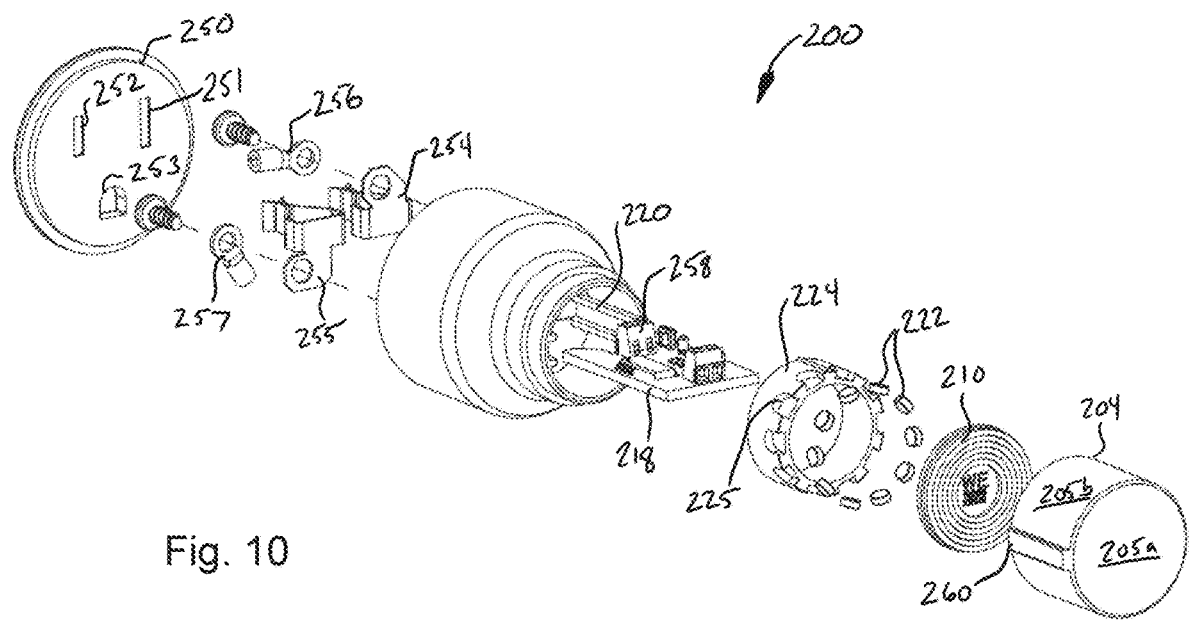
FIG. 10 is a rear left side perspective exploded view of the plug adapter of FIG. 7.

The housing body 202 may include an outlet face 250 having at least first and second slots 251, 252 formed therein, and may include a third slot 253. The slots 251-253 may be configured to receive corresponding pins of a conventional plug (not shown), e.g., hot, neutral, and grounding (where applicable) pins. The first slot 251 may be associated with a first adapter contact 254 and the second slot 252 may be associated with a second adapter contact 255. Each of the first and second adapter contacts 254, 255 may be disposed within the housing body 202 and accessible via the respective slot 251, 252. As seen in FIG. 10, the first and second adapter contacts 254, 255 may be provided as double leaf spring contacts, but other contact forms may be used as well. A third adapter contact (not shown) may be associated with the third slot 253, although other methods of grounding can be applied.

The first and second adapter contacts 254, 255 may be in electrical communication with a power supply 216. For example, a first ring terminal wire connector 256 may be electrically connected to the first adapter contact 254 and a second ring terminal wire connector 257 may be electrically connected to the second adapter contact 255, with each of the first and second ring terminal wire connectors 256, 257 having a wire or like conductor (not shown) coupling to the power supply 216. In the example shown in FIGS. 9 and 10, the power supply 216 includes a terminal block 258 for receiving wires from the first and second ring terminal wire connectors 256, 257, which can allow electrical power to be delivered from the power supply 216 to the first and second adapter contacts 254, 255 and to a conventional plug received by the plug adapter 200. However, other connection methods may be used as well, including other types of wire connectors, circuit board traces, conductive mechanical connectors, and the like.

Similar to the plug power supply 116 described above, the power supply 216 in the plug adapter 200 may include a printed circuit board 218 or be disposed on multiple boards or other components of the housing body 202. The power supply 216 may further include electronic components (e.g., rectifier, power converter, and/or the like) for modifying, storing, and/or delivering electrical energy to the conventional plug received in the slots 251-253.

The contactless electrical power receiver 210 may be disposed within the housing body 202 adjacent to the coupling interface 214 and configured for electrical connection to the power supply 216. As with the plug 100 described above, the contactless electrical power receiver 210 may be a receiving inductor coil, such as part number 760308105214 available from WURTH ELEKTRONIK, although other types of inductor coils and/or capacitive-type receivers may be used as well, as explained earlier. When the plug adapter 200 is inserted into a receptacle, such as receptacle 20, the contactless electrical power receiver 210 may contactlessly receive electrical power from the receptacle, which may then be provided to the power supply 216 and then to the conventional plug received in the slots 251-253 via, for example, the adapter contacts 254, 255.

As shown in FIGS. 7-10, the housing body 202 may be configured such that the outlet face 250 is arranged at an end opposite from the coupling interface 214 and the contactless electrical power receiver 210. In this way, the housing body 202 extends over a generally longitudinal direction for ease of use. However, other shapes of the housing body 202 may be used as well, which may incorporate bends or angles to allow for use of the plug adapter 200 in tight or abnormally shaped spaces where a straight housing body 202 may not allow for convenient insertion of the conventional plug into the plug adapter 200 and/or insertion of the plug adapter 200 into a receptacle.

As with the plug 100, the plug adapter 200 may include one or more magnets 222 disposed within the housing body 202, and particularly within or adjacent to the coupling interface 214, which may serve to secure and/or align the plug adapter 200 within a receptacle. Such magnets 222 may also be used for reed switch activation in the wall outlet, as explained above. In the embodiment shown in FIGS. 7-10, the coupling interface 214 may also include a longitudinally extending rib 260 protruding from a sidewall 205b thereof. Such a rib 260 may be received in the groove 23 shown in the receptacle 20 of FIGS. 1-2, which may help to optimize alignment of the plug adapter 200 relative to the receptacle 20. Of course, other structures and mechanisms for aligning and/or securing the plug adapter 200 may be used as well.

Returning to FIG. 2, in some embodiments additional functionality may be incorporated into the wall outlet 10 aside from contactless power transmission. For example, the wall outlet 10 may be equipped to facilitate wireless communication over a network. FIG. 2 shows an example of a wireless communication circuit 40 for this purpose, which may be disposed within the housing 12. In this example, the wireless communication circuit 40 may be provided within the PCB enclosure 34, although the wireless communication circuit 40 may alternatively be located in other portions of the housing 12, as desired.

The wireless communication circuit 40 may be powered by the power supply 28 of the wall outlet 10, which may include electronic components for conditioning the power received from the in-wall power source according to the requirements of the wireless communication circuit 40. However, in other embodiments, the wireless communication circuit 40 may have its own on-board or separate dedicated power supply (not shown) that directly receives leads from the in-wall power source. In still other embodiments, conditioning may be apportioned between the main power supply 28 of the wall outlet 10 and additional circuitry provided for and/or with the wireless communication circuit 40.

The wireless communication circuit 40 may be connected to an antenna 42 for transmitting and receiving data signals. The antenna 42 shown in FIG. 2 is a patch antenna that may be disposed within the housing 12, such as within the PCB enclosure 34. A patch antenna is ideal for the wall outlet 10 due to its low profile. However, other types of antennas may be used as well, and may allow for extension outside of the housing 12 when necessary. In the embodiment shown in FIG. 2, the patch antenna 42 is connected to the wireless communication circuit 40 via a ribbon cable 41, but other methods of attachment, including direct mounting of the antenna 42 on-board with the wireless communication circuit 40, may be used as well.

In some embodiments, the wireless communication circuit 40 may include a wireless router, which may be used to create a network to which other external devices, such as smartphones, laptops, tablets, and/or other computing devices may connect. The wireless communication circuit 40 may utilize WIFI communication protocols to facilitate use of the network, although other protocols may be used instead of, or in addition to, WIFI. The wireless communication circuit 40 may connect (via a wire or wirelessly) to an external modem (not shown) to connect the created network to an external network, such as the Internet. In other embodiments, the wireless communication circuit 40 may further include its own modem. In such embodiments, the wireless communication circuit 40 may include a jack (not shown) for receiving a hard-wired connection from an Internet or other network service provider. Alternatively, the wireless communication circuit 40 may include a wireless connection to an external network, such as via a cellular connection or the like. In some embodiments, the wireless communication circuit 40 includes a wireless communication extender or wireless communication repeater, which may expand the reach of an existing network created by another wall outlet 10 or other, external wireless router.

Figure 6:
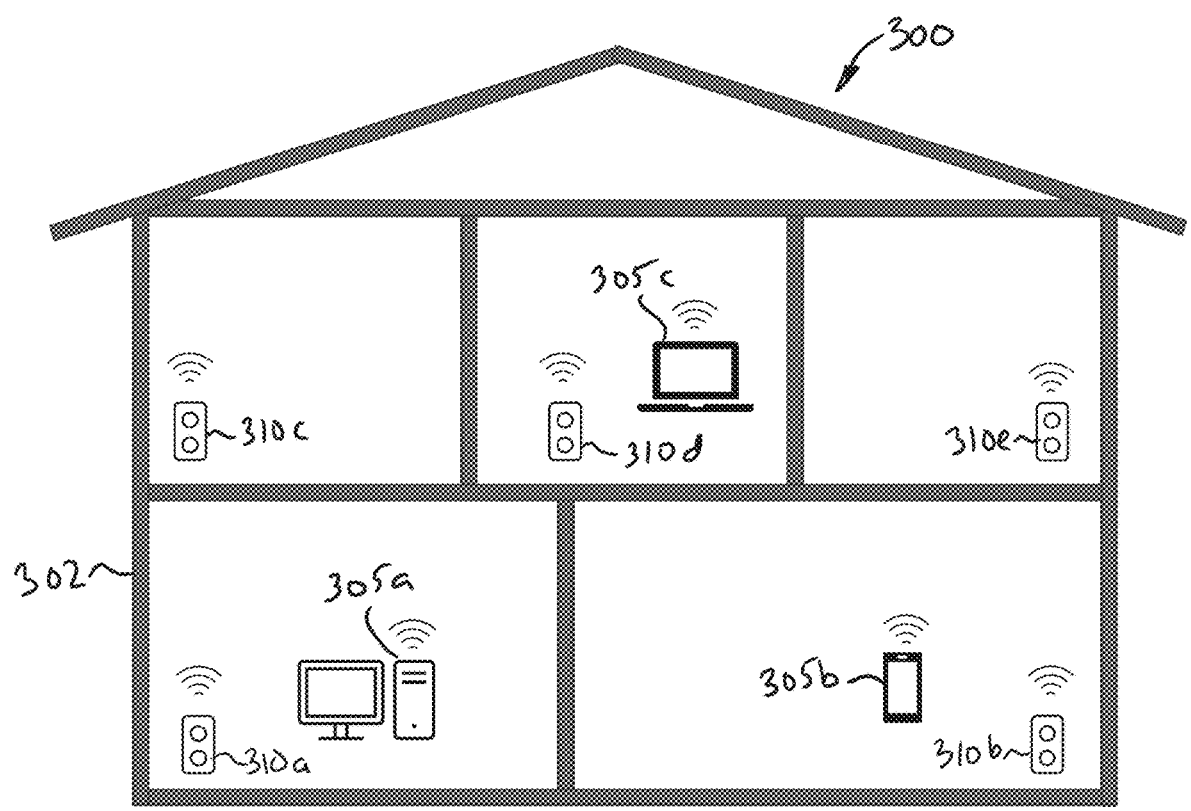
FIG. 6 is a schematic block diagram of a plurality of wall outlets with wireless communication capability deployed in a network setting in accordance with another embodiment of the present invention.
Figure 7:
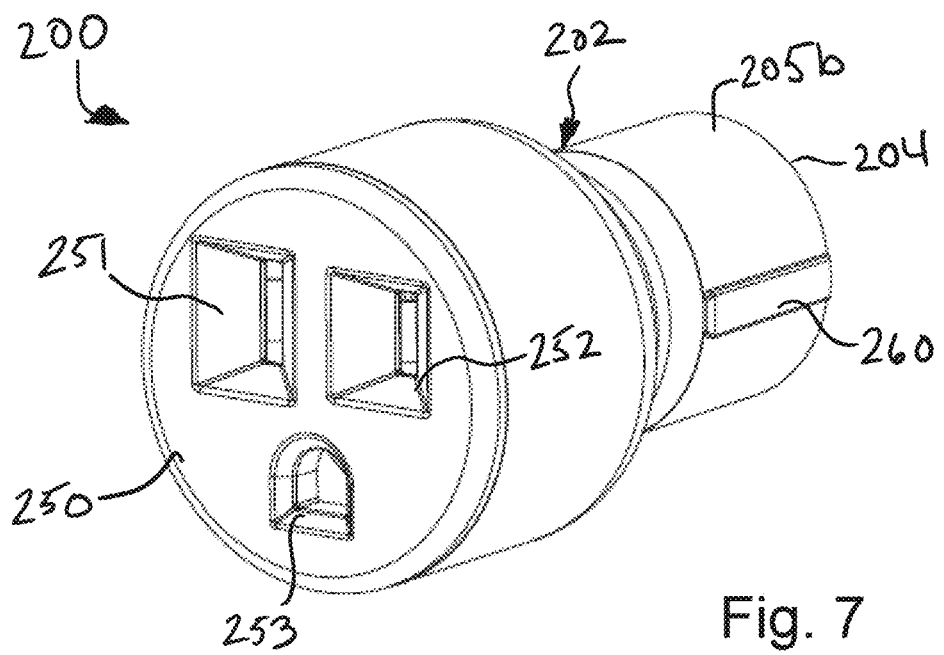
FIG. 7 is a front left side perspective view of a plug adapter in accordance with another example embodiment of the present invention.
Figure 8:
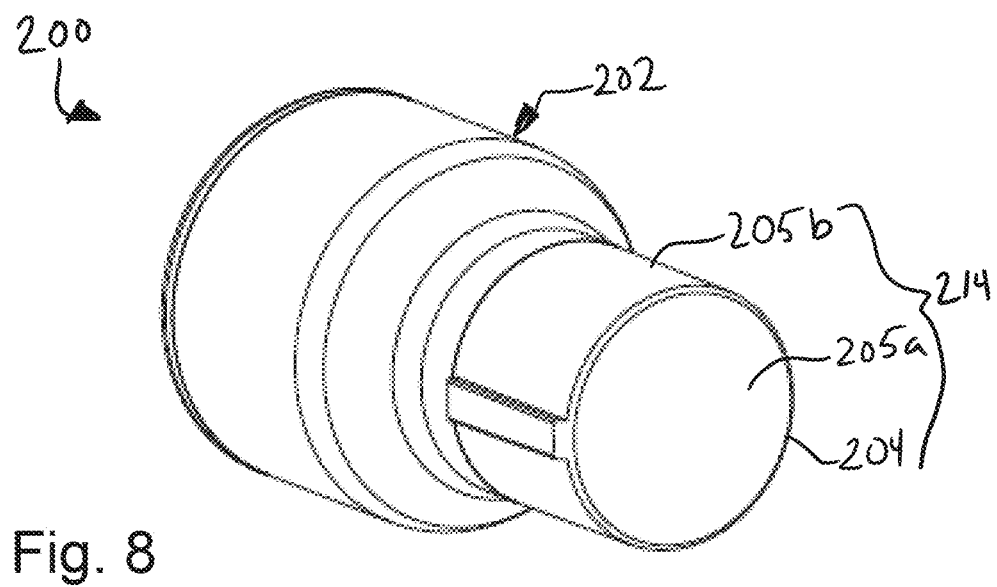
FIG. 8 is a rear left side perspective view of the plug adapter of FIG. 7.
Figure 9:
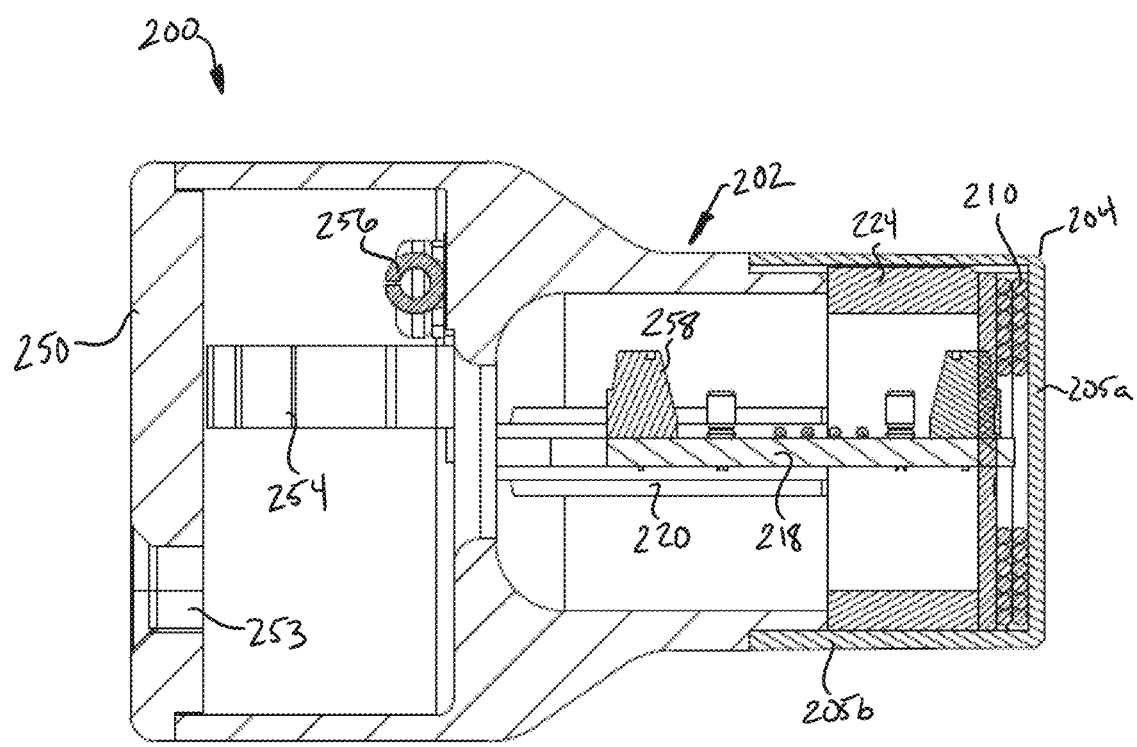
FIG. 9 is a left side elevational cross-sectional view of the plug adapter of FIG. 7.

A plurality of wall outlets so-equipped may be configured to establish or connect to a common wireless network. The common network may be a star network, a mesh network, or another like network topology. FIG. 6 shows a schematic example of a network 300 established among a plurality of wall outlets 310*a-e*, to which any number of external wireless devices 305*a-c* may connect. In some networks, one or more of the wall outlets 310*a-e* may have a wireless communication circuit that serves as a central hub of the network 300, although in other networks, no central hub may be needed. In still other embodiments, the wall outlets 310*a-e* may connect to an existing network with its own external central hub (not shown). At least one of the wall outlets 310*a-e* may have a wireless communication circuit that includes a wireless router and/or a modem, as described above. This would remove the need for external modems and/or routers with exposed cables that occupy floor, desk, or shelf space. At least one of the wall outlets 310*a-e* may have a wireless communication circuit that includes a wireless communication extender or a wireless communication repeater. For example, wall outlet 310*a* may include a modem and router, while wall outlets 310*b-e* serve as repeaters or extenders to enhance connection capabilities throughout the building 302 in which the wall outlets 310*a-e* are deployed. In other embodiments with a pre-existing external network, all of the wall outlets 310*a-e* may operate as repeaters or extenders. It should be noted that in some embodiments, each of the wall outlets 310*a-e* may have all of the necessary hardware included to operate as a modem, router, repeater, and/or extender, and may be configured (e.g., through an external device) to perform one or more of these functions in the common network 300. For example, the first wall outlet 310*a* may be designated as the main and include the modem and router functions, while the other outlets 310*b-e* can be designated as repeaters. It may also be possible to change functionality among the wall outlets 310*a-e*, if desired. This arrangement allows for redundancy as well—if the main outlet 310*a* malfunctions, another one of the outlets 310*b-e* can be redesignated for modem/router functions to avoid downtime of the network 300. The common network 300 preferably is configured to connect with the Internet, either through a modem incorporated into one or more of the wall outlets 310*a-e* or through an external modem (not shown).

Referring again to FIG. 2, the wall outlet 10 may include at least one controller 44, which may be a microcontroller unit (MCU), a central processing unit (CPU), a microprocessor, an application specific controller (ASIC), a programmable logic array (PLA), combinations thereof, or the like. The controller 44 may include or be coupled to a memory (not shown) that may store code or software for carrying out processes described herein and/or carrying out other operations of the wall outlet 10 and may store data for later transfer to remote or external devices. It should be further appreciated that although the controller 44 referred to in this example is a single component mounted on the board with the power supply 28, the controller 44 may be mounted elsewhere within the housing 12 (e.g., with the wireless communication circuit 40 or the like), or may include a plurality of individual devices, with control functions divided among the individual devices.

When the wall outlet 10 includes a wireless communication circuit 40, in particular one acting as a modem and/or wireless router, the wall outlet 10 and the network it facilitates can become vulnerable to cyber-attacks. In addition to conventional protections (e.g., installation of firewalls, anti-virus and anti-trojan software, virtual private network usage, and the like), the wall outlet 10 may provide additional safeguards to alert a user of a potential cyber-attack and/or take other preventative measures.

For example, where the wireless communication circuit 40 derives power from the power supply 28 for operations, the controller 44 may be configured to collect, store, and analyze data related to patterns regarding power usage from the power supply 28 with respect to time. The goal is for the controller 44 to learn power usage patterns that can serve for comparison to detect power usage anomalies (e.g., excessive power usage at a particular time of day or the like) that may be representative of intrusive activity on the network. Thus, the controller 44 may determine, based on the analyzed data, whether a current power usage from the power supply 28 is anomalous. For example, the controller 44 may learn that power usage is minimized during overnight hours (when a user is typically sleeping). A detected power spike at 1 AM would be anomalous to the regular pattern, and worthy of attention as evidence of a potential cyber-attack.

Figure 11:
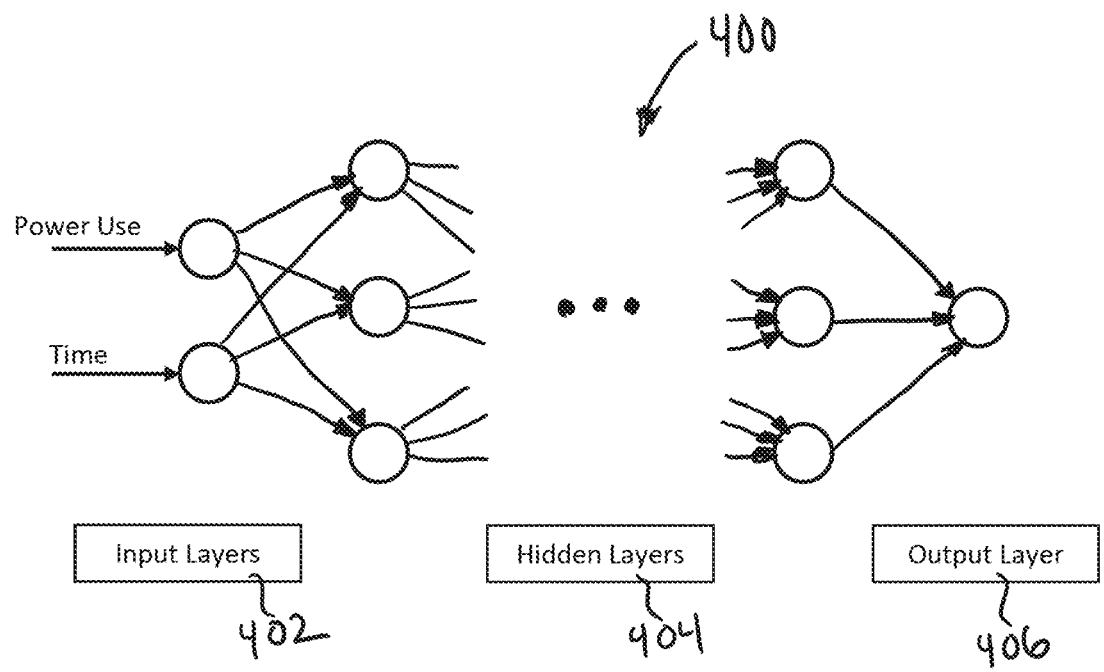
FIG. 11 is a schematic diagram representing a neural network for use in detecting power usage anomalies in a wall outlet in another example embodiment of the present invention.

In some embodiments, the controller 44 may utilize machine learning, which can be performed by, for example, a neural network, random forests, support vector machines, or the like, to analyze the data and make determinations regarding anomalous activity. FIG. 11 shows an example of a neural network 400 that may be used by the controller 44. Power usage data and time data, among others, may be provided as inputs at the input layer 402. The neural network 400 may also include a number of hidden layers 404 to operate on the input data and produce one or more outputs at an output layer 406. In some embodiments, the neural network 400 may be a convolutional neural network where the controller 44 may convert the power usage, time, and other data into image data that is subsequently provided to the input layer 402. Other types of machine learning can be used as well.

It may also be possible in a network 300 including a plurality of wall outlets 310a-c, to share power usage data so that, for example, one of the wall outlets 310a-e may have a main controller that is responsible for monitoring power usage throughout the system. That is, wall outlet 310a, for example, may collect power usage data from the other wall outlets 310b-e in learning the power usage habits of the user, and for detecting anomalies. Alternatively, each of the wall outlets 310a-e may have its own controller responsible for monitoring its own power usage. Other configurations for multiple outlets 310a-e may be used as well.

Figure 12:
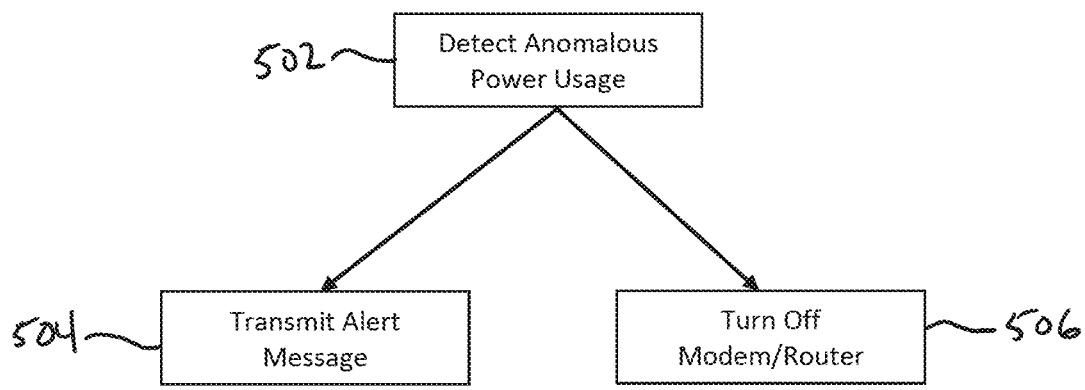
FIG. 12 is a flow chart representing an example method performed by a controller of a wall outlet.

When the controller 44 determines, using the trained neural network 400 or other another technique, that a detected power usage is anomalous in view of the historical power usage data, action may be taken. FIG. 12 illustrates an example method. First, at step 502, the controller 44 may determine that the current power usage, based on the analyzed data, is anomalous. At step 504, the controller 44 may transmit an alert message to the user notifying the user of the abnormal power usage. The controller 44 may use the wireless communication circuit 40 for this purpose, or the controller 44 may have its own separate communication channel (not shown), e.g., a cellular network connection or the like, to avoid communications over a compromised network. The message may be in the form of an e-mail, SMS or MMS message, or the like. The message may include details provided by the controller regarding the nature and reason for the alert. Alternatively, the wall outlet 10 may have a visual (e.g. light, display, or the like) and/or audio (e.g., speaker, transducer, or the like) indicator (not shown) that directly actuates as an alarm to the user.

At step 506, the controller 44 may additionally or alternatively take a preventive measure, such as turning off the modem and/or wireless router of the wireless communication circuit 40, for example, by cutting power from the power supply 28 to the wireless communication circuit 40, deactivating the antenna 42, or the like. This step may prevent further access to the network and potentially sensitive data therein by the attacker. Substantive corrective action may thereafter be taken by the user, such as cleaning or resetting the wireless communication circuit 40, replacing the wireless communication circuit 40, replacing the outlet 10, or the like.

Figure 13:
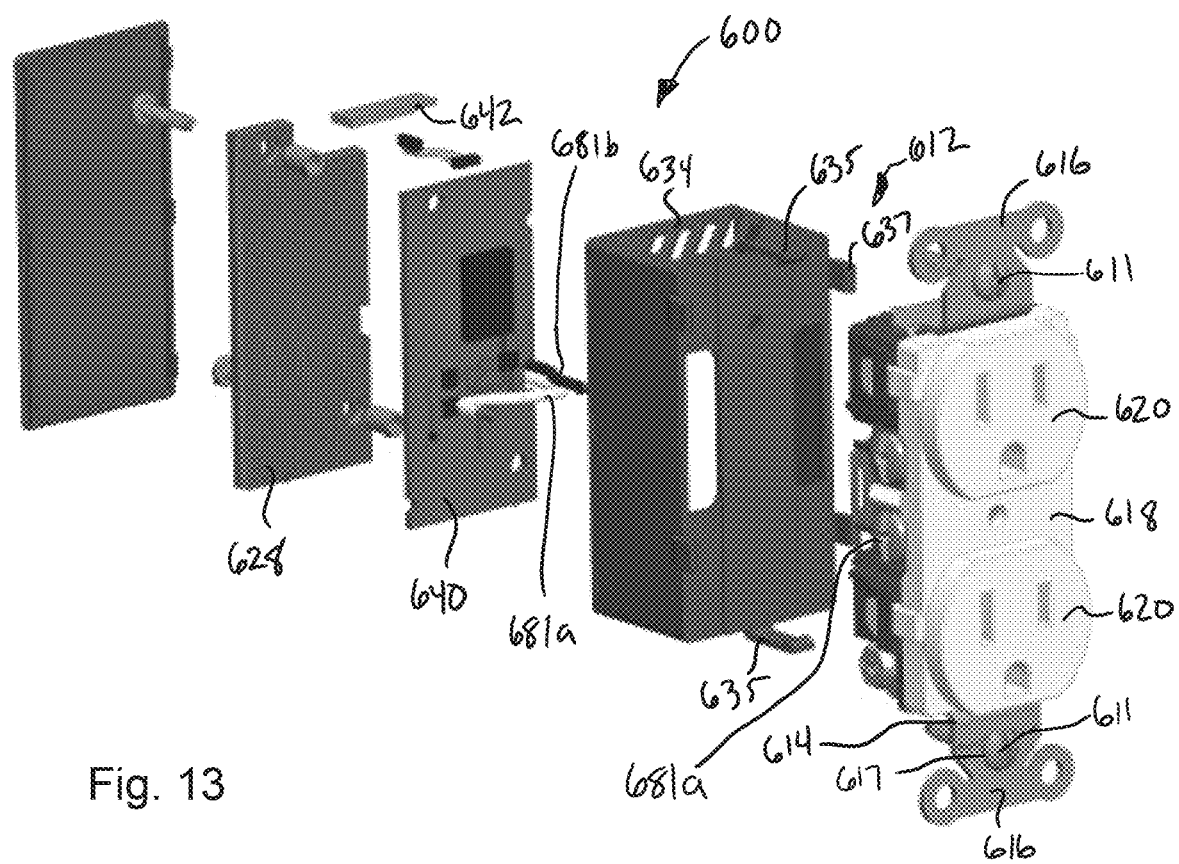
FIG. 13 is a front right side perspective exploded view of a wall outlet in accordance with another example embodiment of the present invention.
Figure 14:
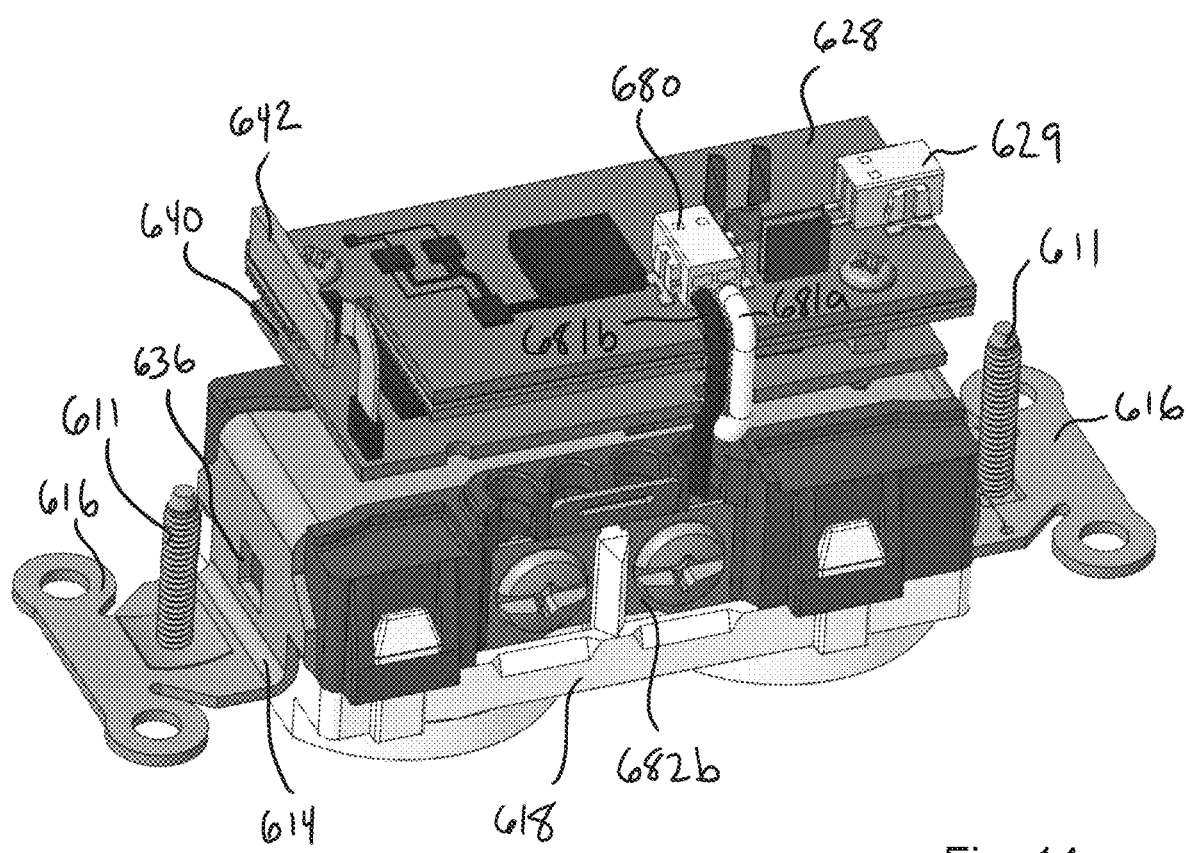
FIG. 14 is a rear left side perspective view of a portion of the wall outlet of FIG. 13.

The above-described functionality related to wireless network integration with a wall outlet and aspects related thereto (e.g., security measures, network architecture, and the like) may, in some alternative embodiments, be utilized in cooperation with a conventional type of wall outlet. FIGS. 13 and 14 illustrate one example outlet 600, wherein a wireless communication circuit and accompanying housing are adapted to an existing conventional wall outlet (such as part number 7159K23 available from MCMASTER-CARR, for example). In other embodiments, the conventional outlet components may be integrated with the wireless communication circuit and housing instead of modifying a pre-existing outlet model.

The outlet 600 may include a housing 612 and a mounting interface 614 that is configured to enable attachment of the housing 612 to a wall (not shown). In the embodiment shown in FIGS. 13 and 14, the mounting interface 614 takes the form of a conventional mounting bracket that may include top and bottom tabs 616 each having one or more fastening slots 617 configured to receive a fastener 611 (e.g., screw, pin, nail, or the like) for securing the housing 612 to a supporting structure. For example, the housing 612 may be secured to and/or within a conventional junction box (not shown) or like structure attached to a wall. In some embodiments, the housing 612 of the outlet 600 may itself perform the function of a junction box, and the tabs 616 and fastening slots 617 of the mounting bracket 614 may be used to secure the housing 612 to another supporting structure on or within a wall. In other embodiments, the mounting interface 614 can take other forms sized, shaped, and oriented to enable the desired attachment. For example, the mounting interface 614 may be provided to enable side mounting to a wall stud or the like. The mounting interface 614 may utilize mechanical fasteners, adhesives, snap connections, combinations thereof, or other like components for enabling attachment to a wall.

While the outlet 600 is shown and described herein as mainly being mounted to or within a wall, the outlet 600 may also be used in other circumstances where outlets may be found, for example, in a vehicle, as part of a portable power supply (e.g., a generator or the like), interior or exterior posts, or the like.

While not shown in FIGS. 13 and 14, the mounting bracket 614 may be configured to receive a ground screw (not shown) for electrical grounding. However, ground wire connections may alternatively be provided by other components of the housing 612 besides the mounting interface 614.

While the mounting interface 614 is shown in FIGS. 13 and 14 as a separate component of the housing 612 that is coupled to other components of the housing 612 by snap-fit, friction-fit, and/or mechanical fasteners, the mounting interface 614 may alternatively be made as a unitary structure with one or more other components of the housing 612, as desired.

The housing 612 may further include a panel 618 that forms one or more receptacles 620. Two receptacles 620 are shown in FIGS. 13 and 14, but any number of receptacles 620 may be provided by the panel 618. Each receptacle 620 may include a conventional two- or three-prong contact configuration.

The housing 612 may also include a PCB enclosure 634. In the embodiment shown in FIG. 13, the PCB enclosure includes a pair of snap arms 635 that are configured to engage with respective recesses 636 provided at the top and bottom of the mounting interface 614. Of course, such recesses 636 may be provided at different locations then those shown and formed by different components of the outlet 600 in addition to or alternative from the mounting interface 614. Although two snap arms 635 are shown in FIG. 13, any number may be used. Additional orientation tabs 637 are also shown and configured to contact other components of the housing 612 or outlet 600 to properly align the PCB enclosure 634. Other methods of attaching the PCB enclosure 634 may be used as well.

A wireless communication circuit 640 may be disposed within the housing 612. In this example, the wireless communication circuit 640 may be provided within the PCB enclosure 634, although the wireless communication circuit 640 may alternatively be located in other portions of the housing 612, as desired.

The wireless communication circuit 640 may be powered by a power supply 628 that may include a supply input 619 is configured to electrically connect to the in-wall power source (not shown), such as in-wall wiring electrically connected to a mains or other building power supply (not shown) or the like. In the embodiment shown in FIG. 14, the supply input 29 may be a terminal block for retaining exposed wire ends (not shown) from the in-wall power source. Wiring may enter the housing 612, for example, via one or more openings (not shown). In some embodiments, the supply input 629 may extend out of or be external to the housing 612. The supply input 629 may take other forms as well, such as wiring that extends outside of the housing 612, a harness or other connector located inside or external to the housing 612, or the like.

In the embodiment shown in FIG. 14, the power supply 628 includes a supply output 680 connected to a pair of contact wires 681a, 681b that may each be received by a respective terminal contact 682a, 682b in electrical communication with the receptacle(s) 620. The supply output 680 may pass the power received by the supply input 629 directly to the terminal contacts 682a, 682b, similar to wiring of a conventional wall outlet. However, there may be instances where the power may be modified between the supply input 629 and supply output 680, depending on the power requirements for the receptacle(s) 620.

For powering the wireless communication circuit 640, the power supply 628 may include electronic components for conditioning the power received from the in-wall power source according to the requirements of the wireless communication circuit 640. However, in other embodiments, the wireless communication circuit 640 may have its own on-board or separate dedicated power supply (not shown) that directly receives leads from the in-wall power source. In still other embodiments, conditioning may be apportioned between the main power supply 628 of the wall outlet 610 and additional circuitry provided for and/or with the wireless communication circuit 640.

As in the contactless outlet embodiments, the wireless communication circuit 640 may be connected to an antenna 642, such as a patch antenna or the like, for transmitting and receiving data signals. The functionality described above for the wireless communication circuit 40 in the contactless outlet embodiments may be replicated in embodiments similar to that shown in FIGS. 13 and 14. For example, in some embodiments, the wireless communication circuit 640 may include a wireless router, which may be used to create a network to which other external devices, such as smartphones, laptops, tablets, and/or other computing devices may connect. The wireless communication circuit 40 may utilize WIFI communication protocols to facilitate use of the network, although other protocols may be used instead of, or in addition to, WIFI. The wireless communication circuit 640 may connect (via a wire or wirelessly) to an external modem (not shown) to connect the created network to an external network, such as the Internet. In other embodiments, the wireless communication circuit 640 may further include its own modem. In such embodiments, the wireless communication circuit 640 may include a jack (not shown) for receiving a hard-wired connection from an Internet or other network service provider. Alternatively, the wireless communication circuit 640 may include a wireless connection to an external network, such as via a cellular connection or the like. In some embodiments, the wireless communication circuit 640 includes a wireless communication extender or wireless communication repeater, which may expand the reach of an existing network created by another wall outlet 600 or other, external wireless router.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A non-metallic contactless electrical wall outlet comprising:
   a housing including a mounting interface and a panel, the mounting interface being configured to enable attachment of the housing to a wall, the panel forming an electrically contactless receptacle that is free of metallic material, the receptacle having a cylindrical sidewall having a groove formed therein and configured to receive a mating rib of a plug received in the receptacle;
   a power supply disposed within the housing and including a supply input configured to electrically connect to an in-wall power source;
   a contactless electrical power transmitter disposed within the housing and adjacent to the receptacle, the contactless electrical power transmitter being configured for electrical connection to the power supply and to contactlessly supply 120 VAC or 240 VAC electrical power to the plug received in the receptacle;
   a reed switch disposed within the housing and configured to enter an activated state when in proximity to a magnetic field generated by the plug while the mating rib is received in the groove of the receptacle sidewall, the reed switch being in electrical communication with the power supply and the contactless electrical power transmitter such that:
   when the reed switch is in the activated state, the contactless electrical power transmitter is electrically connected to the power supply and is enabled to contactlessly transmit electrical power to the plug received in the receptacle, and
   when the reed switch is in an inactivated state, the reed switch prevents electrical connection between the power supply and the contactless electrical power transmitter.

2. The wall outlet of claim 1, further comprising:
a wireless communication circuit disposed within the housing, the wireless communication circuit being configured to facilitate wireless communication over a network.

3. The wall outlet of claim 2, wherein the wireless communication circuit includes a wireless router.

4. The wall outlet of claim 3, wherein the wireless communication circuit further includes a modem.

5. The wall outlet of claim 4, wherein the wireless communication circuit is configured to connect to the Internet.

6. The wall outlet of claim 2, wherein the wireless communication circuit includes one of a wireless communication extender or a wireless communication repeater.

7. The wall outlet of claim 2, wherein the wireless communication circuit includes a patch antenna disposed within the housing.

8. The wall outlet of claim 2, wherein the wireless communication circuit is configured to connect to the Internet.

9. The wall outlet of claim 1, wherein the housing further includes an electrical enclosure connectable to the panel, the contactless electrical power transmitter being disposed between the electrical enclosure and the panel.

10. The wall outlet of claim 9, wherein the electrical enclosure includes a recess that receives at least a portion of the receptacle therein when the panel is connected to the electrical enclosure.

11. The wall outlet of claim 10, wherein the receptacle includes an end wall, the contactless electrical power transmitter being disposed within the electrical enclosure adjacent to the end wall of the receptacle.

12. The wall outlet of claim 1, wherein the receptacle includes at least one magnet disposed proximate to a sidewall of the receptacle.

13. The wall outlet of claim 1, wherein the mounting interface is a mounting bracket.

14. The wall outlet of claim 1, wherein the contactless electrical power transmitter is a transmitting inductor coil.

* * * * *